United States Patent [19]

Olson

[11] 4,250,933
[45] Feb. 17, 1981

[54] SEDIMENT REMOVAL APPARATUS

[76] Inventor: Wayne L. Olson, P.O. Box 3957, Central Point, Oreg. 97502

[21] Appl. No.: 9,367

[22] Filed: Feb. 5, 1979

[51] Int. Cl.³ .............................................. B65B 3/04
[52] U.S. Cl. ..................................... 141/98; 141/231; 222/608
[58] Field of Search ................... 141/377, 98, 231–233; 222/608, 609, 610

[56] References Cited

U.S. PATENT DOCUMENTS

| | | | |
|---|---|---|---|
| 2,648,477 | 8/1953 | Harrington | 141/98 |
| 3,884,395 | 5/1975 | Keenan | 141/231 |
| 4,157,769 | 6/1979 | Radel | 222/608 |

*Primary Examiner*—Houston S. Bell, Jr.
*Attorney, Agent, or Firm*—Chernoff & Vilhauer

[57] ABSTRACT

An apparatus for removing relatively dense particulate or viscous sedimentary waste material from a storage container, transporting the material to a selected location, and depositing the material at that location in a selected manner. A wheeled carriage supports a rotatably mounted elongate holding tank having an axis of rotation parallel to the axes of rotation of the carriage wheels and an elongate aperture extending from end to end thereof. A cover having an inlet for feeding waste material into the tank and an outlet connected to a vacuum pump for reducing air pressure within the tank is supported by a pair of upright standards such that the cover may be sealingly pressed against the tank over its aperture when the aperture is oriented to open upwardly, or lifted up away from the tank to permit the tank to be rotated once it is full. A crank, connected to the tank by a chain, enables the tank to be rotated to place the aperture in any angular position for emptying the tank, thereby enabling the material within the tank to be controllably emptied through the aperture and to be entirely removed from the tank. A baffle placed along one side of the tank directs waste material downwardly as it escapes through the aperture, thereby aiding uniform spreading of the material.

9 Claims, 5 Drawing Figures

SEDIMENT REMOVAL APPARATUS

BACKGROUND OF THE INVENTION

In industrial and commercial activity relatively dense particulate or viscous sedimentary waste material, such as sawdust, gravel, oil and the like, is often produced. Not only is it undesirable, and usually impermissible, to eliminate such waste material by discharging it into an ordinary public sewage system because it tends to obstruct such a system, but such material can often be put to a useful purpose such as, for example, improving the surface of a roadway. However, the removal of such dense, particulate or viscous sedimentary material, the transport of it to a desired location and the spreading of it over a predetermined surface area has heretofore been somewhat impractical due to the difficulties of removal of sedimentary material from a storage container to an intermediate container for transport, and thereafter removal of such material from the intermediate container and controllably spreading the material uniformly over a predetermined area.

Although apparatus for removing waste materials and transporting them to another location have previously been known, none is able entirely to overcome the aforementioned difficulties such that removal and useful application of such sedimentary waste material can be accomplished effectively. For example, Rupp U.S. Pat. No. 2,638,224 discloses an apparatus for cleansing septic tanks which utilizes a portable holding tank and an impeller-type pump for removing sewage from a septic tank to the holding tank and later discharging it at a predetermined location. However, a pump apparatus such as that disclosed in Rupp which requires the pumped material to flow through the impeller is unsuitable for dense, particulate or viscous waste material since that material would tend to damage the pump. Also, such dense, sedimentary material would settle at the bottom of the tank disclosed in Rupp and thereby be difficult to remove, and no provision is made for controlled, uniform spreading of the material when it is discharged.

Jurdye U.S. Pat. No. 3,544,010, directed to a mobile drum for distributing and spraying liquid manure, discloses a vacuum-type pump arrangement that does not require the pumped material to flow through the pump apparatus, which is more suitable for dense, sedimentary waste material, and means for spreading liquid manure over a wide surface area. However, dense, particulate or very viscous material would settle to the bottom of the Jurdye tank from which it would be difficult to remove, and the fan-like discharge apparatus of Jurdye is limited in its ability to spread such material uniformly over a predetermined surface area.

One type of tank mechanism which facilitates the emptying of dense, particulate or highly viscous sedimentary material therefrom is a rotatably mounted tank which enables material at the bottom of the tank to be entirely discharged through an opening in the side of the tank when the tank is rotated such that that opening is downwardly-oriented. Such mechanisms are disclosed, for example, by Clark U.S. Pat. No. 513,881, Murphy U.S. Pat. No. 743,312, Burnett U.S. Pat. 2,420,121, Burton U.S. Pat. No. 1,573,372, and Lutz U.S. Pat. No. 1,651,138. Although each of the rotatable tanks disclosed in the aforementioned patents is mounted upon wheels for mobility, each is also mounted such that its axis of rotation is perpendicular to the axes of rotation of its wheels so that dumping is accomplished only to the side of the apparatus, thereby eliminating any effective spreading function. Moreover, all of the tanks are mere hoppers, in the sense that they must be filled by some external means, and none appears to be suitable for evacuation as is necessary for a vacuum-type of pump arrangement that is desirable to remove dense, particulate or highly viscous material without that material flowing through the pump itself. While Burton and Lutz, in particular, disclose fixed-location, removable covers for closing an opening in such a rotatably-mounted tank, none of the covers appears suitable for providing a strong air-tight seal as would be desirable for use of such a tank with a vacuum-type pump.

Accordingly, there is a need for an improved portable apparatus for removing relatively dense, particulate or highly viscous sedimentary material from a storage container, transporting it to a desired location, and controllably spreading it uniformly over a surface area. Such an apparatus should utilize a pump mechanism for removing that material from the storage container to a portable tank without damage to the pump mechanism. Moreover the apparatus should permit complete discharge of such material, and enable the material to be controllably discharged and uniformly spread over a predetermined surface area.

SUMMARY OF THE INVENTION

The present invention overcomes the drawbacks of prior art waste removal apparatus and meets the aforementioned need for an apparatus suitable for transporting industrial and commercial relatively dense, particulate or highly viscous sedimentary waste material by providing an apparatus having a holding tank mounted upon a wheeled, portable carriage for moving the tank from place to place, a vacuum-type pump apparatus attached to the tank for removing waste material from a storage container into the tank, and means for rotating the tank to discharge the waste material in a controlled, uniform manner. In order to perform these functions the tank is provided with an aperture therein which may be opened for discharge of the waste material, but may be sealed air-tight for removal of the waste material into the tank.

Preferably the tank is cylindrical in shape, and the aperture therein is elongate, running from one end of the tank to the other so that as the tank is rotated the sedimentary material inside will spill out through the opening along the entire length of the tank, thereby covering the surface area of the ground beneath the tank uniformly throughout almost the entire width of the apparatus. In addition, the axis of rotation of the tank is placed parallel to the axes of rotation of wheels of the carriage on which the tank is mounted so that the material may also be spread uniformly in the direction of movement of the apparatus, which ordinarily would be pulled by a truck, tractor or the like, resulting in a uniform ribbon of material as wide as the tank and spread over the ground for the distance that the apparatus is pulled until all of the waste material has been exhausted.

The tank is provided with a device for rotation thereof, and for controlling the angular position of the aperture therein so that the rate of discharge of material may likewise be controlled, the rotation device permitting the aperture to be oriented downwardly to discharge the material therein entirely. This also facilitates cleaning of the tank when necessary since the tank can be washed out with water when the opening is downwardly directed.

In order conveniently to support the holding tank rotatably and to provide a shock absorbing effect when the apparatus is being moved, the tank is preferably attached at both ends of its axis of rotation by bearings to conventional vehicle wheels which, in turn, have conventional tires mounted thereon that rest in respective cradles formed in the carriage. Thus, the wheels remain stationary while the tank rotates with respect thereto and the tires act as pneumatic shock absorbers.

A removable cover for the tank aperture is mounted in a fixed position with respect to the angular orientation of the tank by a pair of standards located at respective ends of the tank and attached to the carriage. The cover may be lifted upwardly and forced downwardly by a pair of lever arms so that when the aperture of the tank is placed in an upwardly-directed position beneath the cover, the cover may be forceably placed over it. Alternatively, the cover may be lifted away so that the tank may be rotated. The apparatus is provided with fasteners for securely attaching the cover to the tank after the cover has been forced downwardly over that aperture in order to maintain an air-tight seal.

Removal of waste material from a storage container into the tank is accomplished by evacuating the tank with a pump connected to the inside of the tank through an outlet while an inlet to the tank is connected by a hose to the container. Ordinarily, the container would contain a mixture of liquid and relatively dense, particulate or highly viscous sedimentary material. As the tank is evacuated the low pressure in the tank draws the waste material into the tank without its having to flow through and ultimately damage the pump mechanism, which requires a tank that may be pressure sealed. In addition, in order to permit the tank to be rotated, the tank outlet to the pump and the inlet through which waste is drawn are placed in the tank aperture cover, which remains stationary when the tank is rotated for emptying, since during the emptying process no pressure seal needs to be maintained.

A hand crank or motorized drive mechanism is attached to the frame and connected to the tank by a sprocket and a chain for rotating the tank. This enables the aperture of the tank to be placed at any angular position, thereby permitting control of the rate of discharge of material therein and complete emptying of the tank. Also, an elongate baffle is placed adjacent the tank along the back side thereof so that material flowing out of the aperture will strike the baffle, fall straight downwardly and produce a uniform flow, rather than be thrown outwardly in a random manner. Preferably the baffle is formed from one side of a large water tank which may be filled with water for placement in the holding tank to facilitate emptying heavy material, and cleaning the interior and exterior of the tank.

Accordingly, it is a principal objective of the present invention to provide a new and improved portable apparatus for removing industrial and commercial waste material from a storage container to an intermediate holding tank, transporting it to a selected area, and discharging it at that area.

It is another objective of the present invention to provide such an apparatus that is particularly adapted for removal of relatively dense, particulate or highly viscous sedimentary waste material.

It is a further objective of the present invention to provide such an apparatus which is particularly adapted for spreading the waste material in a controlled, uniform manner over a predetermined area.

It is a principal feature of the present invention that it utilizes a rotatably-mounted, elongate holding tank having a pressure sealable aperture therein throughout its length and a vacuum pump apparatus for filling the tank.

It is another feature of the present invention that the aforementioned holding tank is mounted upon a wheeled carriage for transport from place to place and that the axis of rotation of the tank is disposed parallel to the axes of rotation of the carriage wheels.

It is a further feature of the present invention that it utilizes an aperture cover which is fixed relative to the angular position of the tank, supports an outlet for evacuating the tank and an inlet for filling the tank, and is adapted to pressure seal the aperture of the tank.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
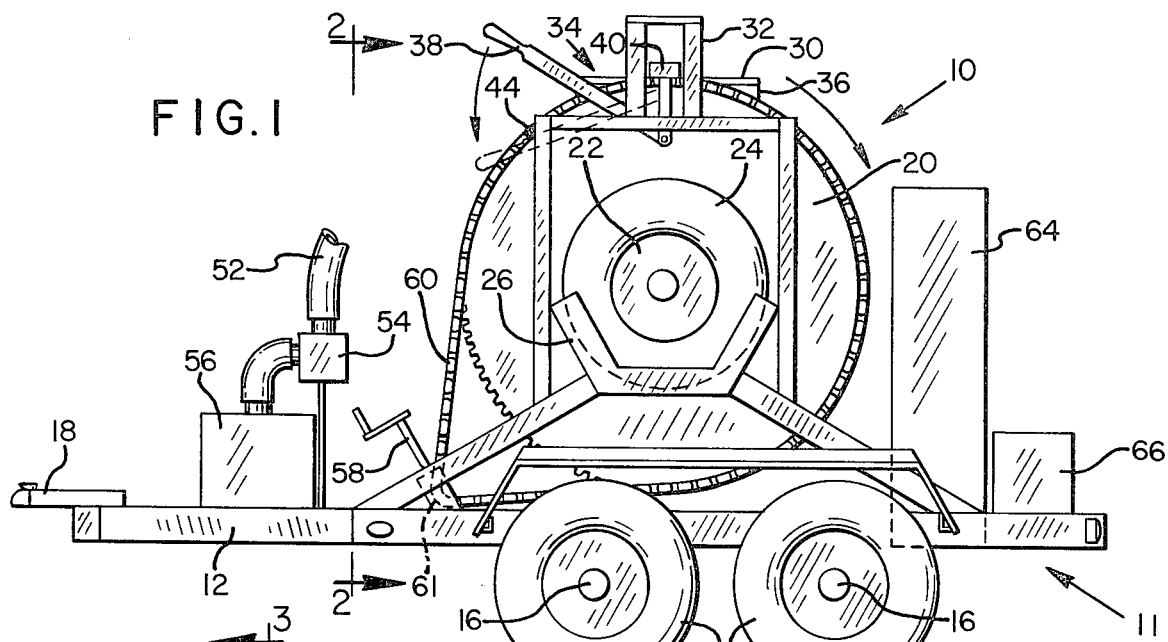
FIG. 1 is a side view of an exemplary embodiment of the sediment removal apparatus of the present invention.
Figure 2:
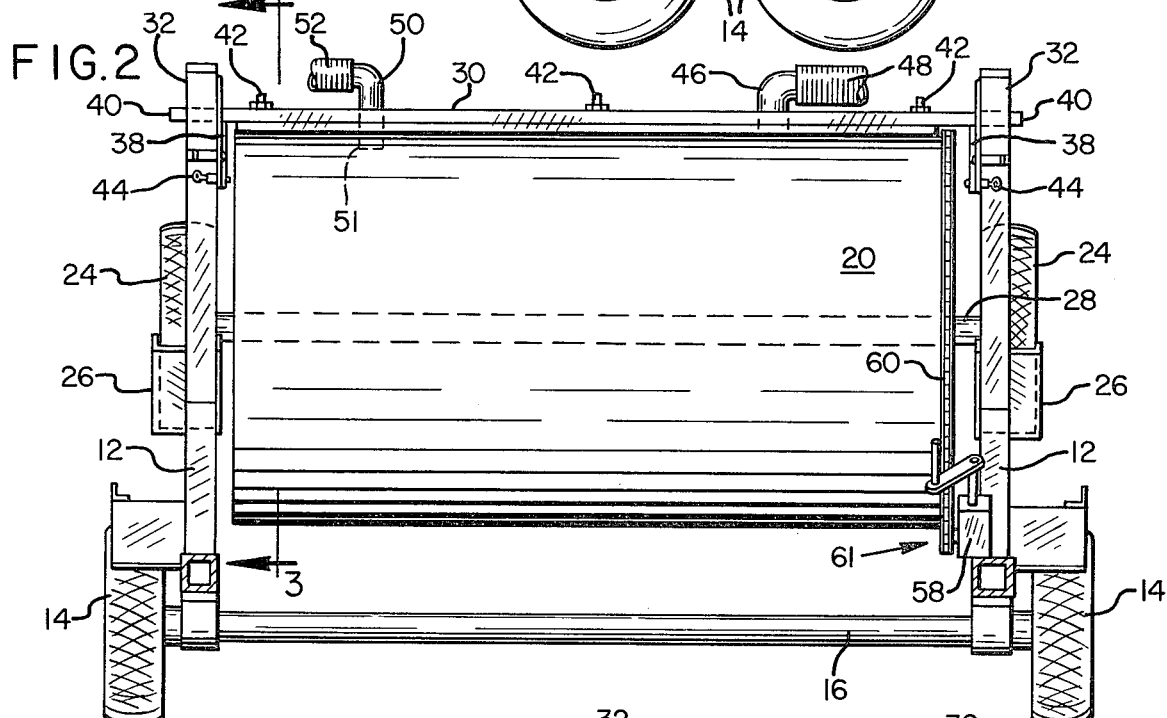
FIG. 2 is a front section of the embodiment of the invention shown in FIG. 1, taken along line 2—2 of FIG. 1.

Referring to FIGS. 1 and 2 a preferred embodiment 10 of the sediment removal apparatus of the present invention utilizes a carriage 11 having a frame 12 movably supported by two pairs of transport wheels 14, each pair of which has an axle 16 defining a corresponding axis of rotation. (Although two pairs of transport wheels are preferred to reduce the load on a given wheel, one pair only might be used.) The carriage may be part of a self-propelled vehicle or a trailer having a hitch 18 for being pulled by a vehicle.

A holding tank 20, preferably of elongate, cylindrical shape, is rotatably mounted upon the frame by a pair of tank wheels 22 upon which inflated tires 24 are mounted, the tires 24 resting in a pair of respective cradles 26 formed by the frame. The tank is attached to its wheels 22 preferably by an axle 28 which is rotatably connected to the wheels by respective conventional bearings (not shown), the tank axle 28 being parallel to the transport wheel axles 16 such that the axis of rotation of the tank is parallel to the axes of rotation of the transport wheels.

The tank has an aperture 34 therein, extending substantially the entire length of the tank and being formed by a rim 36. An elongate cover 30, positioned by upright standards 32 attached to the frame 12 at each end of the cover on respective sides of the apparatus, is disposed at the top of the apparatus, the standards permitting the cover to be moved upwardly and downwardly but preventing any substantial lateral movement thereof. The cover 30, which is flat, may be moved downwardly in the standards and held against the rim to produce a vacuum seal.

In order to fasten the cover securely to the tank and thereafter to lift the cover off, a pair of lever arms 38 are rotatably attached to the frame 12 and by respective linkages to tabs 40 on the cover which protrude laterally into the standards 32, the lever arms permitting the cover to be lifted upwardly or to be pressed firmly against the rim 36 for sealing the tank. Once the cover is pressed against the rim of the tank it may be securely fastened by a plurality of threaded fasteners such as bolts 42 and respective nuts. When the cover is lifted up it may be held in place in its up position by locking the lever arms 38 down utilizing respective latches 44, of any conventional type such as a spring loaded pin, attached to the frame.

In order to draw waste material into the tank the cover 30 is provided with an inlet 46 for accepting a hose 48 placed into a container of waste material. The cover is also provided with an outlet 50 for accepting a hose 52 connected through a moisture trap 54 to a vacuum pump 56 mounted upon the frame for lowering the pressure within the tank and thereby drawing waste material through the hose 48 into the tank. The outlet 50 preferably is also provided with a conventional ball float 51 for preventing liquid from entering the pump. Since the inlet 46 and the outlet 50 are attached to the cover 30 of the apparatus, when the cover is removed from the tank 20 the tank is free to rotate, without removal of the hoses. The pump 56 may also be reversed to force air into the tank and also into a container of waste material to produce bubbling which tends to loosen up the material and make it easier to remove.

Although other manual or motorized means might be utilized to rotate the tank 20, the embodiment shown is provided with a hand crank 58 attached to the frame 12 and connected by a chain 60 to the tank. The chain wraps around the tank and is attached at each end thereto, for example by welding, and around a sprocket 61 attached to the hand crank 58. Accordingly, when the cover has been released from and lifted off of the tank aperture, the tank may be rotated to any angular position for emptying or cleaning.

Figure 3A:
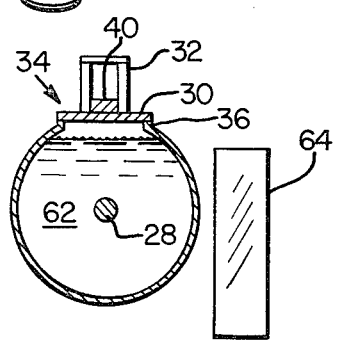
FIG. 3A is a side section of holding tank, standard, cover and water tank portions of the embodiment shown in FIG. 2, taken along line 3—3 of FIG. 2.
Figure 3B:
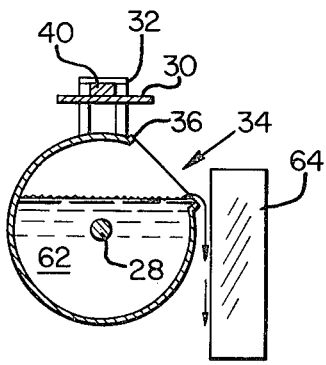
FIG. 3B is a side section as shown in FIG. 3A with the holding tank portion in a first rotated position.
Figure 3C:
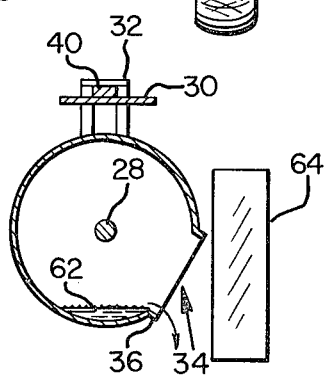
FIG. 3C is a side section as shown in FIG. 3A with the holding tank portion in a second rotated position.

Turning now to FIGS. 3A-3C, FIG. 3A shows the tank in a position with its aperture 34 directed upwardly and the cover 30 sealingly closed thereon. The tank is also shown filled with a mixture 62 of liquid, for example water, and dense waste material. Although other means might be used as well, a water storage tank 64, supported by the frame 12, is mounted adjacent the tank 20 to act as a baffle when the mixture is discharged through the tank aperture. The water storage tank also provides a source of water for mixing with the waste material to facilitate its removal to the holding tank 20 and subsequent discharge, and cleaning of the apparatus and the interior of the tank. To this end the apparatus may also be provided with a water pump 66 and accompanying conventional hoses (not shown).

FIG. 3B shows the tank with its cover removed and in a slightly rotated position so that the mixture can flow out of the opening, against the baffle (water tank 64) and downwardly in an even fashion. As the level of the mixture decreases the tank may be rotated further, as shown in FIG. 3C, until the entire mixture has been discharged. Thereafter, the tank may be cleaned out using water from the water tank under pressure from the water pump 66 while it is in a position approximately 300° opposite from its position shown in 3C so that the interior of the tank may be reached without obstruction from the water tank 64.

In its usual application, the apparatus 10 is towed by a vehicle to the location of a waste storage container, the holding tank 20 is placed such that its aperture 34 is in an upright position, and the cover 30 is forced downwardly against the opening rim 36 by the lever arms 38 and fastened to the tank by the threaded fasteners 34 to produce a vacuum seal. The inlet hose 48 is then connected at one end to the inlet 46 and at its other end it is placed in the waste material. If the waste material does not have sufficient liquidity water may be pumped into it from the water tank 64 by the pump 66. The vacuum pump 56, which is connected to the outlet 50 by the hose 52 is then started, which lowers the pressure within the tank and draws the dense waste material into the tank. As the material enters the tank it settles to the bottom so that the upper part of the tank may be further evacuated. Once the tank is full it can no longer be evacuated, so it stops drawing waste therein and the pump is shut off. As a precaution the ball float 51 and moisture trap 54 prevent any of the waste material from getting into the vacuum pump.

The inlet hose 48 is then removed from the waste container and the apparatus is towed to a location where spreading of the material is desired. For example, if the waste material comprises oil it may be desirable to spread the oil over a graveled roadway to improve the surface of the roadway. At that location the nuts attached to bolts 42 of the cover may be removed and the cover lifted by the lever arms 38, which can than be locked in position by their respective latches 44. The tank 20 is then rotated by the crank 58 (preferably clockwise as shown in FIG. 1) so that the waste material begins to spill out evenly along the length of the tank. The side of the water tank 64 serves as a baffle to cause the material to flow evenly downward rather than splash randomly away from the tank. As the tank is emptied it may be pulled along a surface area such as a roadway thereby producing an even ribbon of material over the surface. Under manual control the tank must periodically be rotated further until it is empty; however, it is recognized that the rotation of the holding tank could be automatically synchronized with time or with the level of material in the tank and the speed at which the apparatus is towed to provide a more even discharge of material.

After all of the material has essentially been emptied, water from the water tank 64 may then be pumped inside to clean the holding tank for further use, possibly with other materials.

The terms and expressions which have been employed in the foregoing specification are used therein as terms of description and not of limitation, and there is no intention of the use of such terms and expressions of excluding equivalents of the features shown and described or portions thereof, it being recognized that the scope of the invention is defined and limited only by the claims which follow.

What is claimed is:

1. A portable apparatus for removing sedimentary waste material from a storage location, transporting the material to a selected location, and controllably depositing the material at said selected location in a selected manner, comprising:
  (a) a carriage having at least two rotatably mounted transport wheels disposed respectively on opposite sides of said carriage for supporting said carriage and transporting said apparatus, said wheels having respective axes of rotation oriented in the same predetermined direction;
  (b) elongate tank means, rotatably supported by said carriage, said tank means having an axis of rotation parallel to the axes of rotation of said transport wheels and an elongate aperture formed therein extending substantially the entire length of said tank means;
  (c) cover means, supported by said carriage and attachable to said tank means, for sealingly closing said aperture;
  (d) pump means, connected to said cover means, for reducing the pressure within said tank means in order to draw sedimentary waste material into said tank means from a storage location; and
  (e) means, connected to said tank means, for rotating said tank means on its axis of rotation to any selected position within a predetermined range, enabling material to be controllably emptied from said tank means through said aperture.

2. The apparatus of claim 1, wherein said carriage includes frame means for supporting said tank means and said cover means, said frame means including standard means for restricting said cover means to translational movement toward and away from said tank means, said cover means having an inlet defined therethrough for receiving said waste material into said tank means.

3. The apparatus of claim 2, further comprising means, associated with said cover means and said tank means, for sealingly closing said aperture of said tank means with said cover means, and an outlet disposed within said cover means, said pump means being attached to said outlet for reducing the pressure within said tank means in order to draw said material into said tank means through said inlet.

4. The apparatus of claim 2, further comprising lever arm means, attached to said frame means and said cover means, for forcing said cover means against said tank means over said aperture, and fastener means for attaching said cover means to said tank means.

5. The apparatus of claim 4 wherein said lever arm means is adapted to lift said cover means off said tank means, and said apparatus further comprises latch means, attached to said frame means, for engaging said lever arm means to hold said cover means in place removed from said tank means.

6. The apparatus of claim 1, further comprising baffle means, mounted upon said carriage, for deflecting material escaping from said aperture of said tank means, said baffle means having a substantially flat elongate side vertically oriented with its elongate dimension parallel to said axis of rotation of said tank means.

7. The apparatus of claim 1, further comprising cradle means, attached to said carriage, for supporting said tank means, and a pair of pneumatic cushion means, rotatably attached respectively to opposite ends of said tank means and disposed upon respective portions of said cradle means, for rotatably supporting said tank means.

8. The apparatus of claim 7 wherein said pneumatic cushion means each comprise support wheels having inflated tires mounted thereon and being rotatably attached to opposite ends of said tank means, and said cradle means is adapted for receiving the tires of said respective support wheels.

9. The apparatus of claim 1, wherein said means for rotating said tank means comprises crank driven sprocket means attached to said carriage, and a chain operatively extending around said tank means and said crank driven sprocket means, said chain being attached to said tank means, for rotating said tank means in response to rotation of said crank driven sprocket means.

* * * * *